United States Patent
Menezes

(10) Patent No.: US 7,364,294 B2
(45) Date of Patent: Apr. 29, 2008

(54) PROGRESSIVE ADDITION LENSES WITH REDUCED UNWANTED ASTIGMATISM

(75) Inventor: Edgar V. Menezes, Roanoke, VA (US)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 0 days.

(21) Appl. No.: 11/520,379

(22) Filed: Sep. 13, 2006

(65) Prior Publication Data

US 2007/0030445 A1 Feb. 8, 2007

Related U.S. Application Data

(60) Continuation of application No. 10/870,114, filed on Jun. 17, 2004, which is a continuation-in-part of application No. 10/726,735, filed on Dec. 3, 2003, now Pat. No. 6,883,916, which is a division of application No. 09/832,236, filed on Apr. 10, 2001, now Pat. No. 6,709,105.

(51) Int. Cl.
*G02C 7/02* (2006.01)
*G02C 7/06* (2006.01)

(52) U.S. Cl. .................... 351/177; 351/169
(58) Field of Classification Search ........ 351/169, 351/176, 177
See application file for complete search history.

(56) References Cited

U.S. PATENT DOCUMENTS

| | | | |
|---|---|---|---|
| 4,906,090 A | 3/1990 | Barth | |
| 5,631,798 A | 5/1997 | Seymour et al. | |
| 5,644,374 A | 7/1997 | Mukaiyama et al. | |
| 5,691,798 A | 11/1997 | Smith | |
| 5,715,032 A | 2/1998 | Isenberg | |
| 5,726,734 A | 3/1998 | Winthrop | |
| 5,771,089 A | 6/1998 | Barth | |
| 5,861,935 A | 1/1999 | Morris et al. | |
| 5,886,766 A | 3/1999 | Kaga et al. | |
| 5,892,565 A | 4/1999 | Ueno et al. | |
| 5,910,832 A | 6/1999 | Roddy | |
| 5,926,250 A | 7/1999 | Mukaiyama et al. | |
| 6,019,470 A | 2/2000 | Mukaiyama et al. | |
| 6,074,062 A | 6/2000 | Morris et al. | |
| 6,106,118 A | 8/2000 | Menezes et al. | |
| 6,139,148 A | 10/2000 | Menezes | |
| 6,183,084 B1 * | 2/2001 | Chipman et al. | 351/176 |
| 6,199,984 B1 | 3/2001 | Menezes | |
| 6,366,823 B1 | 4/2002 | Shirayanagi | |
| 6,390,623 B1 | 5/2002 | Kokonaski et al. | |

(Continued)

FOREIGN PATENT DOCUMENTS

EP 1026533 8/2000

(Continued)

OTHER PUBLICATIONS

E. Masura, et al., Visual Acuity Remedying Device Using Two Progressive Multifocus Lenses, DialopIP, 63-254415, Oct. 21, 1998 (Abstract only).

*Primary Examiner*—Jordan M. Schwartz
(74) *Attorney, Agent, or Firm*—Occhiuti Rohlicek & Tsao LLP

(57) ABSTRACT

The invention provides lenses in which the maximum unwanted astigmatism is reduced and distributed over a wide area.

9 Claims, 6 Drawing Sheets

U.S. PATENT DOCUMENTS

| | | |
|---|---|---|
| 6,669,337 B2 | 12/2003 | Welk et al. |
| 6,709,106 B2 | 3/2004 | Kelch et al. |
| 2004/0263778 A1* | 12/2004 | Wooley ............... 351/169 |

FOREIGN PATENT DOCUMENTS

| | | |
|---|---|---|
| EP | 1063556 | 12/2000 |
| JP | 2000249992 | 9/2000 |
| WO | 00/72051 | 11/2000 |
| WO | WO00/72051 | 11/2000 |
| WO | 03/048841 | 6/2003 |

* cited by examiner

Astigmatism

Astigmatism

PROGRESSIVE ADDITION LENSES WITH REDUCED UNWANTED ASTIGMATISM

The present invention relates to multifocal ophthalmic lenses. In particular, the invention provides progressive addition lens designs, and lenses in which unwanted astigmatism is reduced, which lenses are substantially free of localized unwanted astigmatism maxima. This application is a continuation of application Ser. No. 10/870,114, filed Jun. 17, 2004, which is a continuation-in-part of application Ser. No. 10/726,735, filed Dec. 3, 2003, now U.S. Pat. No. 6,883,916, which is a divisional of application Ser. No. 09/832,236, filed Apr. 10, 2001, issued as U.S. Pat. No. 6,709,105.

FIELD OF THE INVENTION

Background of the Invention

The use of ophthalmic lenses for the correction of ametropia is well known. For example, multifocal lenses, such as progressive addition lenses ("PALs") are used for the treatment of presbyopia. The progressive surface of a PAL provides far, intermediate, and near vision in a gradual, continuous progression of vertically increasing dioptric power from far to near focus, or top to bottom, of the lens.

PALs are appealing to the wearer because PALs are free of the visible ledges between the zones of differing dioptric power that are found in other multifocal lenses, such as bifocals and trifocals. However, an inherent disadvantage of PALs is the presence of unwanted astigmatism, or astigmatism that is undesirable and is introduced or caused by one or more of the lens' surfaces. Unwanted astigmatism can produce swim, image magnification, and motion effects for the lens wearer that disrupts the wearer's vision. In hard PAL lens designs, the unwanted astigmatism borders the lens channel and near vision zone. In soft designs, the unwanted astigmatism may extend into the distance zone. Generally, in both designs, the unwanted astigmatism at or near its approximate center reaches a maximum that corresponds approximately to the near vision dioptric power of the lens. A need exists for lens designs in which these localized maxima are reduced or substantially eliminated.

BRIEF DESCRIPTION OF THE DRAWINGS

FIG. 1b is a power and cylinder contour profile of the lens of FIG. 1a.

FIG. 2b is a power and cylinder contour profile of the lens of FIG. 2a.

FIG. 3b is a power and cylinder contour profile of the lens of FIG. 3a.

FIG. 4b is a power and cylinder contour profile of the lens of FIG. 4a.

FIG. 5b is a power and cylinder contour profile of the lens of FIG. 5a.

DESCRIPTION OF THE INVENTION AND ITS PREFERRED EMBODIMENTS

Figure 1A:
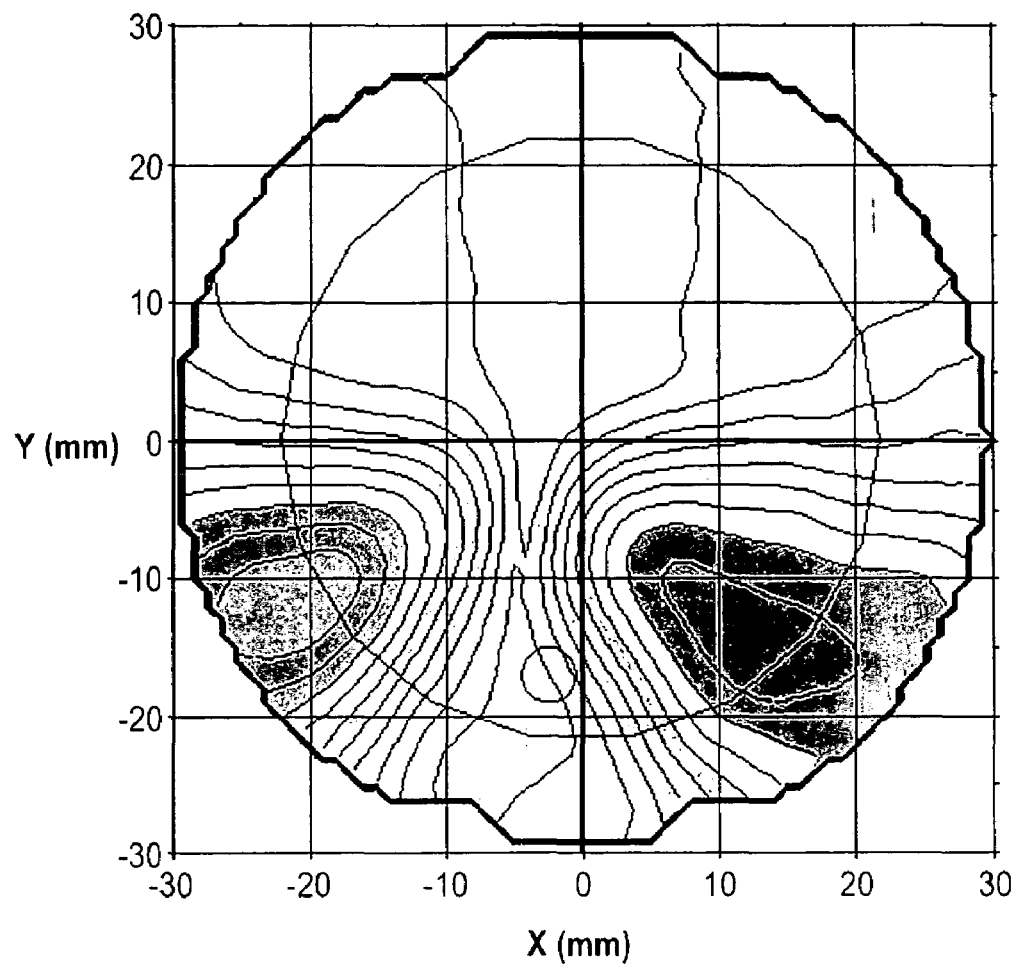
FIG. 1a is a contour map of the unwanted astigmatism of a first prior art progressive lens.

The present invention provides lenses, and methods for their design and manufacture, in which the maximum unwanted astigmatism is reduced and distributed over a wide area. The lenses of the invention are provided by locally manipulating sag values of a progressive surface.

In one embodiment, the invention provides a method for designing a progressive addition lens, comprising, consisting essentially of, and consisting of: a.) designing a first progressive addition surface having a channel and one or more areas of unwanted astigmatism on either side of the channel, each area of unwanted astigmatism comprising a maximum unwanted astigmatism; b.) expressing the first surface as a plurality of sag values; and c.) modifying each of the one or more areas of unwanted astigmatism to provide a second progressive addition surface in which the maximum unwanted astigmatism of each of the areas is reduced and the unwanted astigmatism is substantially constant within each of the areas. In another embodiment, the invention provides lenses made according to this method.

By "lens" is meant any ophthalmic lens including, without limitation, spectacle, contact, intraocular lenses and the like. Preferably, the lens of the invention is a spectacle lens. By "sag value" is meant the absolute value of the z axis distance between a point on a progressive surface located at coordinates (x, y) and a corresponding point on a reference plane. For purposes of the invention, the z axis is the axis orthogonal to the x-y plane.

By "progressive addition surface" or "progressive surface" is meant a continuous, aspheric surface having distance and near viewing zones, and a zone of increasing dioptric power connecting the distance and near zones. One ordinarily skilled in the art will recognize that, if the progressive surface is the convex surface of the lens, the distance vision zone curvature will be less than that of the near zone curvature and if the progressive surface is the lens' concave surface, the distance curvature will be greater than that of the near zone.

By "channel" is meant the corridor of vision that is free of unwanted astigmatism of about 0.75 diopters or greater when the wearer's eye is scanning through the intermediate vision zone to the near vision zone and back. Preferably the corridor of vision is free of unwanted astigmatism of about 1.00 diopters or greater.

By "unwanted astigmatism" is meant astigmatism that is undesirable and is introduced or caused by the lens surface. For purposes of the invention, the areas of unwanted astigmatism considered are those located on either side of the channel and preferably below the fitting point. By "fitting point" is meant is the point on a lens aligned with the wearer's pupil in its distance viewing position when the wearer is looking straight ahead.

In the first step of the method of the invention, a first progressive surface is provided by any convenient optical design method. This surface, u(x, y), may be a single progressive surface or a surface that is the result of combining one or more progressive and regressive surfaces. By "regressive surface" is meant a continuous, aspheric surface having zones of distance and near vision and a zone of decreasing dioptric power connecting the distance and near zones. If the regressive surface is the convex surface of the lens, the distance zone curvature will be greater than that of the near zone and if the regressive surface is the lens' concave surface. The distance curvature will be less than that of the near zone.

Designing of the first progressive surface u(x, y) preferably is carried out using a method that divides the surface into a number of sections and provides a curved surface equation for each area as disclosed, for example, in U.S. Pat. No. 5,886,766 incorporated herein in its entirety by reference. Optimization of the surface may be carried out by any convenient method. Additional properties of a specific lens wearer may be introduced into the design optimization process including, without limitation, variations in the pupil diameter of about 1.5 to about 7 mm, image convergence at a point about 25 to about 28 mm behind the front vertex of the surface, pantoscopic tilt of about 7 to about 20 degrees and the like, and combinations thereof.

The distance and near vision powers for the progressive addition surface design u(x, y) are selected so that powers of the lens are those needed to correct the lens wearer's visual acuity. The dioptric add power will typically be about +0.10 to about +6.00 diopters. Generally, the distance curvature of the progressive surface will be within about 0.25 to about 8.50 diopters. The near vision curvature will be about 1.00 to about 12.00 diopters.

In the second step of the method of the invention, the surface u(x,y) is expressed as a plurality of sag values. This step may be carried out by subtracting u(x,y) from the base spherical surface $u_o(x, y)$, with a curvature equal to the distance curvature or base curvature, to yield the surface's sag values v(x,y). The coordinates of the point of maximum unwanted astigmatism $x_m, y_m$ on one side of the channel are located.

One ordinarily skilled in the art will recognize that, for the progressive surface u(x,y), the principal curvatures $c_1$ and $c_2$ at any point x,y may be given by:

$$c_1 = H + [H^2 - K]^{1/2} \quad \text{(I)}$$

$$c_2 = H - [H^2 - K]^{1/2} \quad \text{(II)}$$

where:

$$H = \frac{(1+u_x^2)u_{yy} - 2u_x u_y u_{x,y} + (1+u_y^2)u_{xx}}{2(1+u_x^2+u_y^2)^{3/2}} \quad \text{(III)}$$

and $$K = \frac{u_{xx}u_{yy} - u_{xy}^2}{(1+u_x^2+u_y^2)^2} \quad \text{(IV)}$$

wherein H is the Gaussian curvature; and
K is the mean curvature.

For the curvature, c, in a particular direction y, the above equations reduce to:

$$C = \frac{\frac{\partial^2 u}{\partial y^2}}{\left(1+\left(\frac{\partial u}{\partial y}\right)^2\right)^{3/2}} \quad \text{(V)}$$

For optical lenses, the dioptric power, P(x,y), and unwanted astigmatism, A(x,y), at a point on the lens at x,y are given by:

$$P = (n-1)*[c_1+c_2]/2 \quad \text{(VI)}$$

$$A = \text{Abs}[c_1-c_2] \quad \text{(VII)}$$

wherein n is the refractive index; and

Abs stands for "absolute value."

The coordinates of the maximum unwanted astigmatism may be defined as $x_m, y_m$ and are typically located on either side of the channel. The equations may be used to reduce the magnitude of the unwanted astigmatism on a progressive surface while maintaining the required power in the area. However, a result of this reduction will be that the astigmatism will increase at another location on the surface due to a change in curvature at that location. Optimization techniques have been developed which include merit functions to specify where the astigmatism may be allowed to increase. One such technique is disclosed in U.S. Pat. No. 6,302,540. Such techniques generally are complicated, time consuming, and tend to impact the progressive surface on a global rather than local scale compromising distance, reading, and channel zone widths, channel length and the like. Thus, such methods are unsuited for producing a progressive surface having areas of unwanted astigmatism in which the magnitude of astigmatism is low.

It is a discovery of the invention that the magnitude of unwanted astigmatism may be reduced in a local area, without increasing unwanted astigmatism at another location on the lens surface, by the following method. In this method, the progressive surface u(x,y) is specified as z sag values at points s on an x-y grid. The grid spacing may be any convenient spacing, but preferably is between about 0.01 and 4 mm, more preferably between about 0.1 and about 2 mm, and most preferably about 0.5 to about 1 mm. The sag values v(x,y) in a local area that includes a point $(x_m, y_m)$ of maximum unwanted astigmatism are selected for the optimization method. This vicinity conveniently may be defined as any geometric shape, but preferably is defined as a circle or more preferably as a square centered at $(x_m, y_m)$. In cases in which a square is used, a square centered around $(x_m, y_m)$ may be formed from a grid with a minimum number of 5 points to a maximum number of 81 points. Preferably, 9 points arranged as a grid of 3×3 points is used. In cases in which a circle is used, preferably the circle's diameter is between about 1 and 10 mm, more preferably between about 3 and 6 mm, most preferably about 4 mm. The 4 mm circle is most preferred because the average pupil diameter projected on the lens surface is approximately 4 mm at normal illumination conditions. If too large an area is used, undesirable changes will result in other areas of the lens.

The sag values v(x, y) are approximated by a toric surface in the local area centered around the unwanted astigmatism maximum. Using this local approximation, the principal curvatures at $x_m, y_m$ are recalculated using Equations I and II. Adjustments are made in the sag values in the surface v(x,y) in increments of between about 0.00001 mm and about 0.01 mm, preferably about 0.0001 mm depending on the grid spacing selected, at grid points which lay closest to the periphery of the area until the maximum unwanted astigmatism shifts to another surface location that is within the area. More specifically, the sag value of each of the points surrounding $(x_m, y_m)$ may be sequentially increased by about 0.0001 mm to determine if the astigmatism at $(x_m, y_m)$ decreases. If the astigmatism does not decrease, then the sag value of each of the points may be sequentially decreased to determine if the astigmatism at $(x_m, y_m)$ decreases. Once the unwanted astigmatism at $(x_m, y_m)$ decreases sufficiently to move the maximum to another point location $(x'_m, y'_m)$, the process at $(x_m, y_m)$ stops and is resumed at points surrounding $(x'_m, y'_m)$.

The process is then repeated until the unwanted astigmatism within the area is substantially free of points at which the magnitude of the maximum astigmatism is at its original level. An area results in which the magnitude of the maximum astigmatism is substantially constant, for example that the unwanted astigmatism has a peak height less than about 0.1 diopters in a 5 mm diameter area. Additionally, the magnitude of the maximum astigmatism is reduced as compared to the maximum astigmatism originally found in the area. The process is then repeated for the areas of maximum, localized unwanted astigmatism on the opposite side of the channel.

In an optional, and preferred, final step of the method of the invention, the resulting surface is smoothed by any suitable fitting technique to eliminate any significant curvature discontinuities, or discontinuities that result in localized power changes of greater than about 0.05 diopters. Any known technique may be used including, without limitation, fitting using polynomial, splines and the like.

The resulting optimized and smoothed surface will not change substantially from the first surface because the optimization is performed locally in the areas of unwanted astigmatism. However, if significant changes do occur, appropriate compensations in power may be incorporated into a complementary surface of the lens to offset the changes. Accordingly, other surfaces designed to adapt the lens to the ophthalmic prescription of the lens wearer may be used in combination with, or addition to, the optimized progressive addition surface. Additionally, the individual surfaces of the lens may have a spherical or aspherical distance vision zone. The channel or corridor of vision free of unwanted astigmatism, may be closer to the distance or near viewing zone. Further, combinations of any of the above variations may be used.

In a preferred embodiment, the lens of the invention has as its convex surface the surface of the invention and a complementary concave surface which concave surface corrects the wearer's astigmatism and prism. The convex surface preferably is of a symmetric, soft design produced by combining two convex progressive surfaces. Both of the progressive surfaces have a channel length of about 10 to about 22 mm. One surface has an aspherical distance viewing zone and the maximum, localized unwanted astigmatism is located closer to the distance than the near viewing zone preferably on either side of the upper two thirds of the channel. The distance zone is aspherized to provide additional plus power to the surface of up to about 2.00 diopters, preferably up to about 1.00 diopters, more preferably up to about 0.50 diopters. Aspherization may be outside of a circle centered at the fitting point having a radius of about 10 mm, preferably about 15 mm, more preferably about 20 mm. The other surface has no aspherical distance viewing zone and the maximum, localized unwanted astigmatism is located closer to the near viewing zone than the distance viewing zone, preferably on either side of the lower two thirds of the channel.

The lenses of the invention may be constructed of any known material suitable for production of ophthalmic lenses. Such materials may be constructed of any known material suitable for production of ophthalmic lenses. Such materials are either commercially available or methods for their production are known. Further, the lenses may be produced by any conventional lens fabrication technique including, without limitation, grinding, whole lens casting, molding, thermoforming, laminating, surface casting, or combinations thereof.

The invention will be clarified further by a consideration of the following, non-limiting examples.

EXAMPLES

Example 1

Figure 1B:
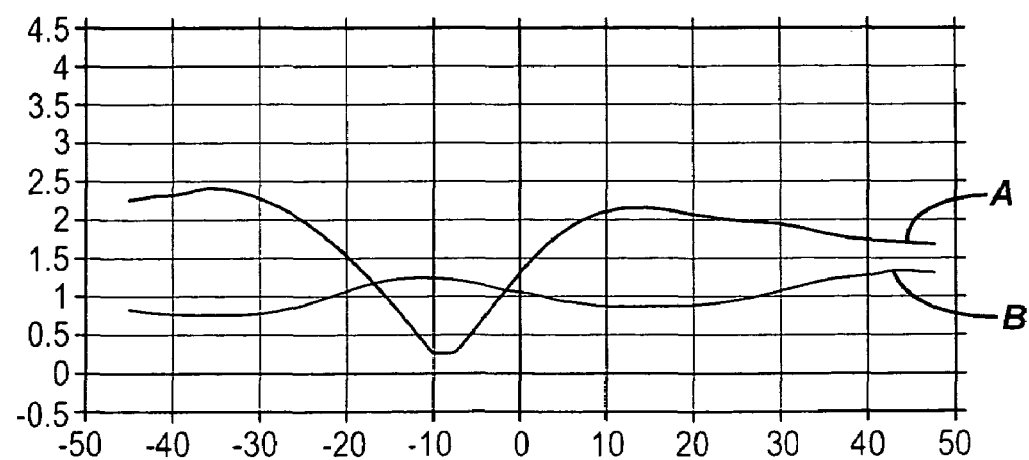
Figure 2A:
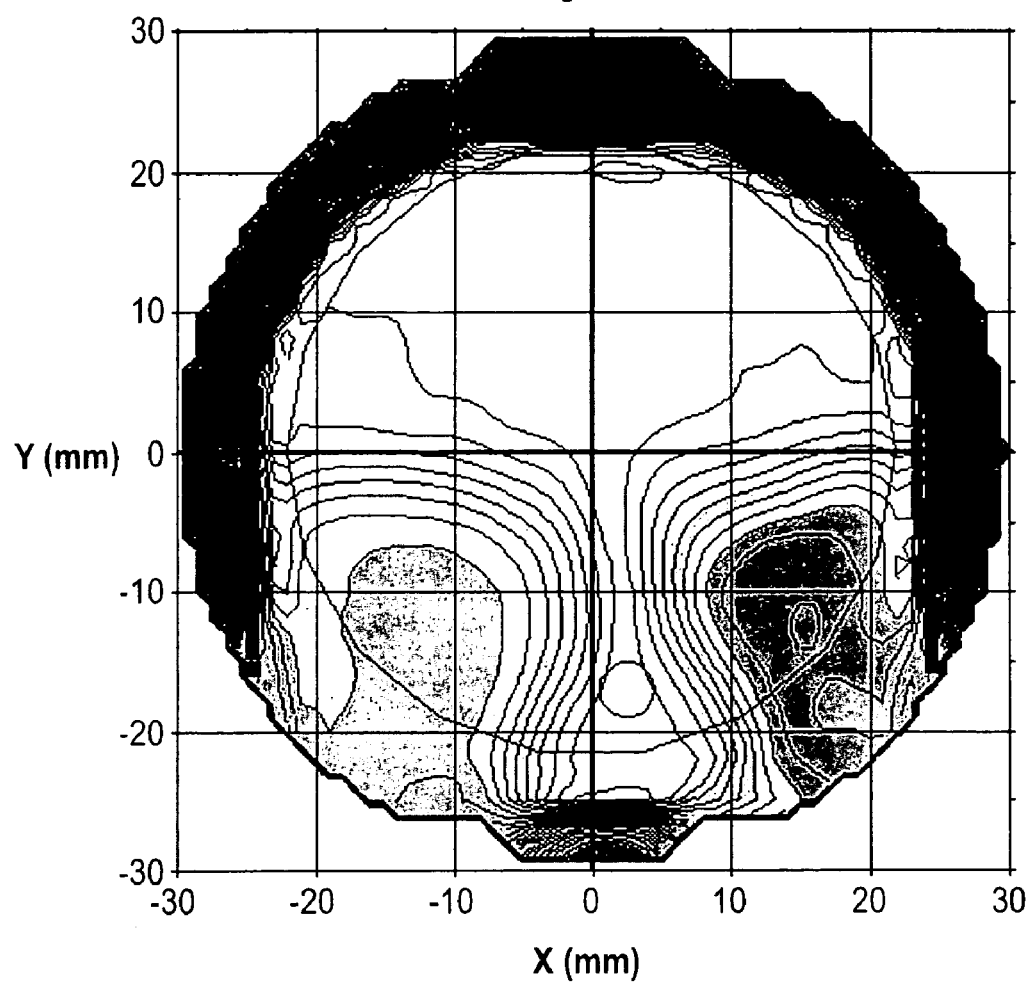
FIG. 2a is a contour map of the unwanted astigmatism of a second prior art progressive lens.
Figure 2B:
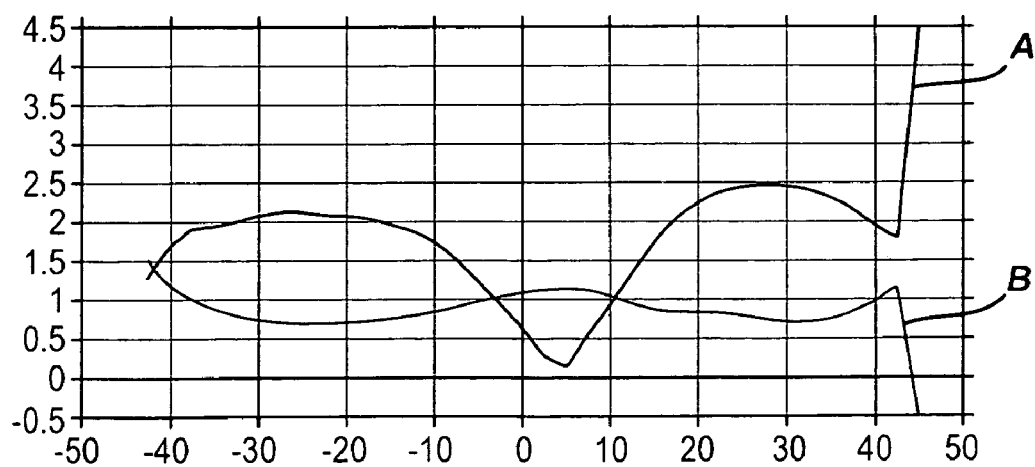
Figure 3A:
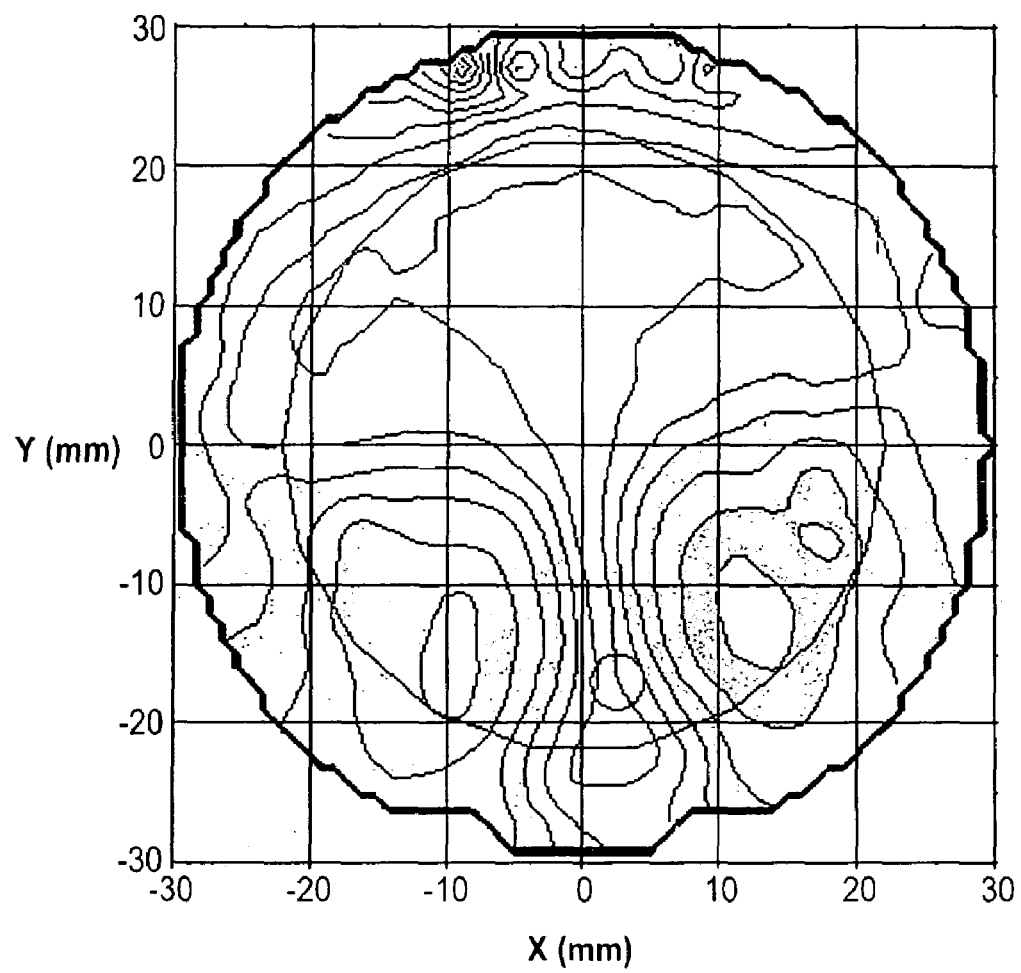
FIG. 3a is a contour map of the unwanted astigmatism of a third prior art progressive lens.
Figure 3B:
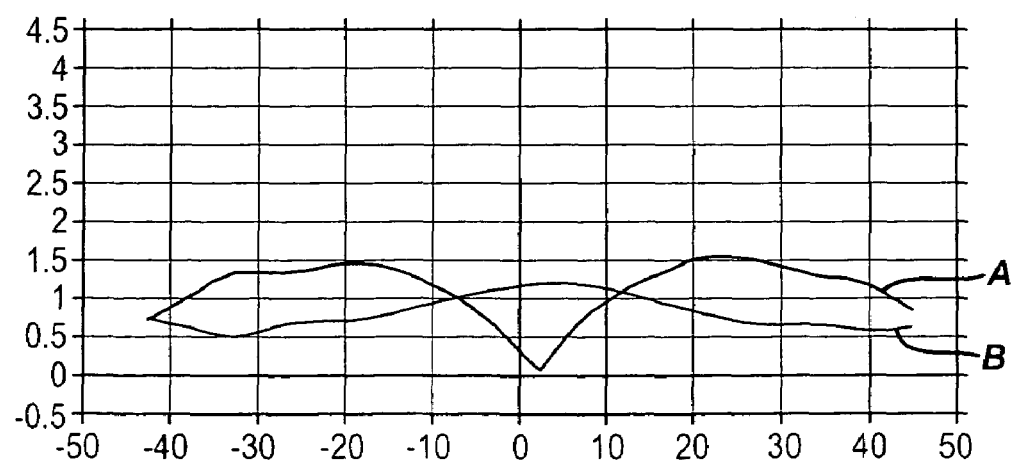

A contour map for a commercially available lens, Varilux COMFORT™, progressive addition lens was created using a coordinate measuring machine and using the sag values obtained in a ray trace program to obtain power and cylinder profiles. The map is shown as FIG. 1a. FIG. 1b shows the cylinder profile (A) and power profile (B) of a cross-sectional portion of the lens at the narrowest portion of the channel. The lens, Lens 1, had a refractive index of 1.498, base curve of 95.1 mm and add power of 2.04 diopters. FIGS. 1a and 1b show that there is a noticeable maximum unwanted astigmatism on either side of the channel. The unwanted astigmatism increases by 0.25 diopters over a 10 mm diameter circle and the maximum unwanted astigmatism within this area is 2.64 diopters and located at x=8.2 mm and y=−10.7 mm. FIG. 2a is a contour map created for Lens 2, a second commercially available lens, Sola PERCEPTA™, having a refractive index of 1.498, a base curve of 99.9 mm and 2.10 diopter add power. FIGS. 2a and 2b show that there is a noticeable maximum unwanted astigmatism on either side of the channel. The unwanted astigmatism increases by 0.40 diopters over a 10 mm diameter circle, the maximum unwanted astigmatism in this area for the second lens is 2.53 diopters at x=15.3 and y=−12.2 mm. FIG. 3a is a contour map created for a Lens 3, third commercial lens, DEFINITY™, having a refractive index of 1.51, a base curve of 106.2 mm and 2.04 diopter add power. FIGS. 3a and 3b show that there is a noticeable maximum unwanted astigmatism on either side of the channel. The unwanted astigmatism increases by 0.25 diopters over a 10 mm diameter circle and the maximum unwanted astigmatism within this area is 1.64 diopters at x=12.5 mm and y=−12.3 mm.

Example 2

Figure 4A:
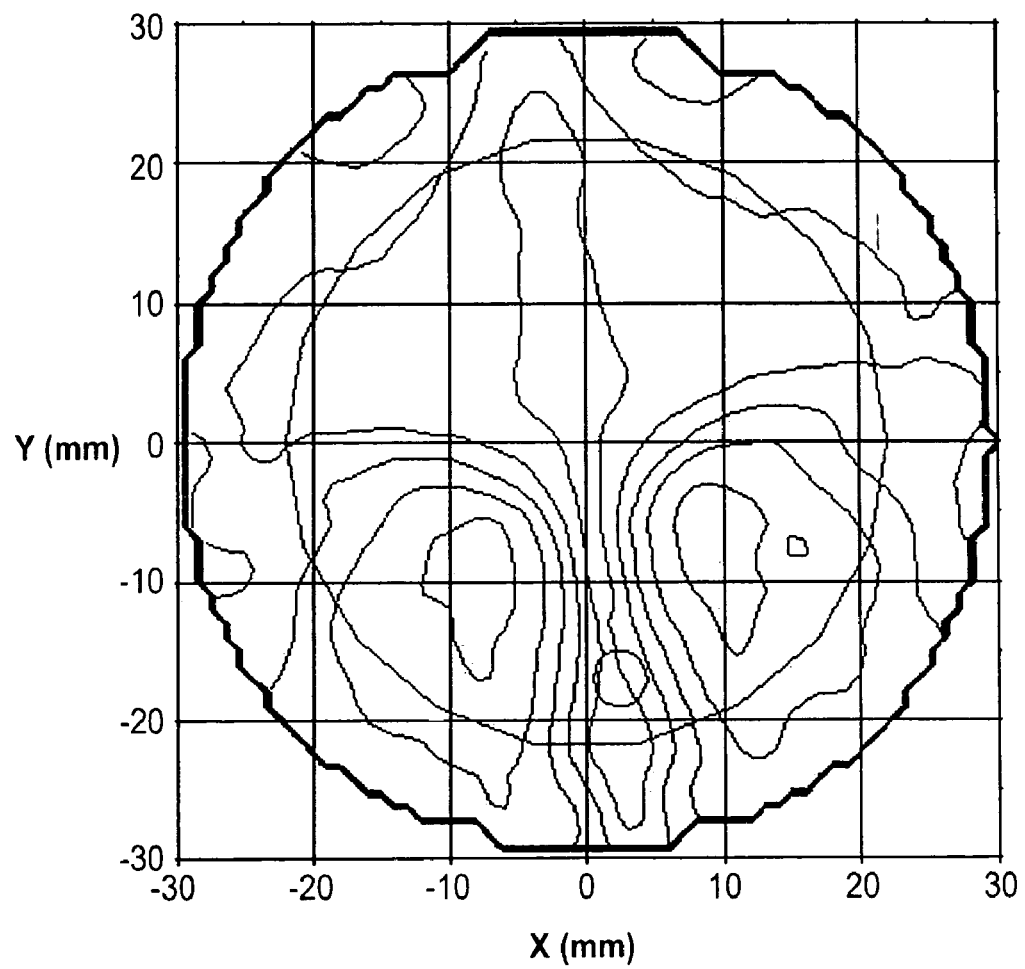
FIG. 4a is a contour map of the unwanted astigmatism of a surface of a lens of the invention.
Figure 4B:
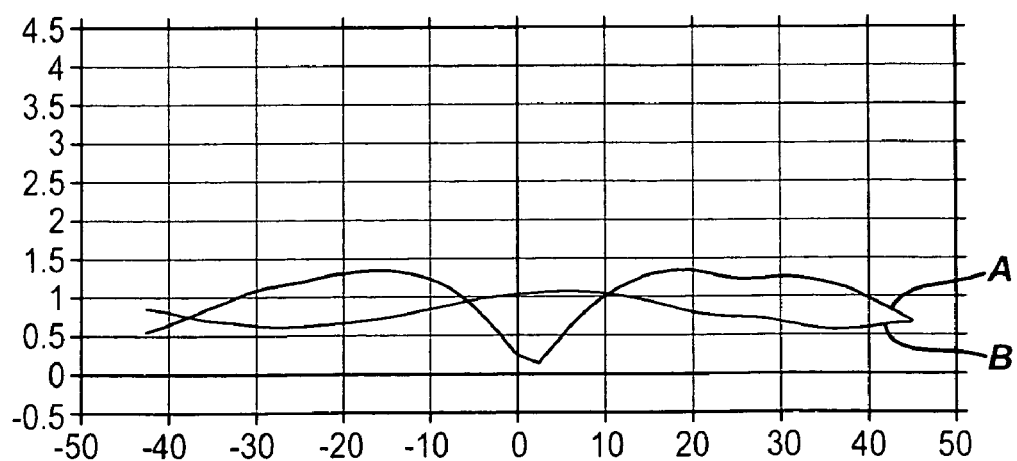

A convex progressive surface (A) was designed using a material refractive index of 1.586, base curve of 104.4 mm, and add power of 2.02 diopters. This surface, Surface 1, had a noticeable maximum unwanted astigmatism on either side of the channel. The unwanted astigmatism increases by 0.20 diopters over a 10 mm diameter circle, and the maximum unwanted astigmatism within this area is 1.36 diopters at x=8.8 mm and y=−7.4 mm. The prism reference point used was x=0 and y=0. FIG. 4b is the power and astigmatism profile of the surface across the narrowest cross-section of the channel. The profile shows a maximum in the unwanted astigmatism.

Figure 5A:
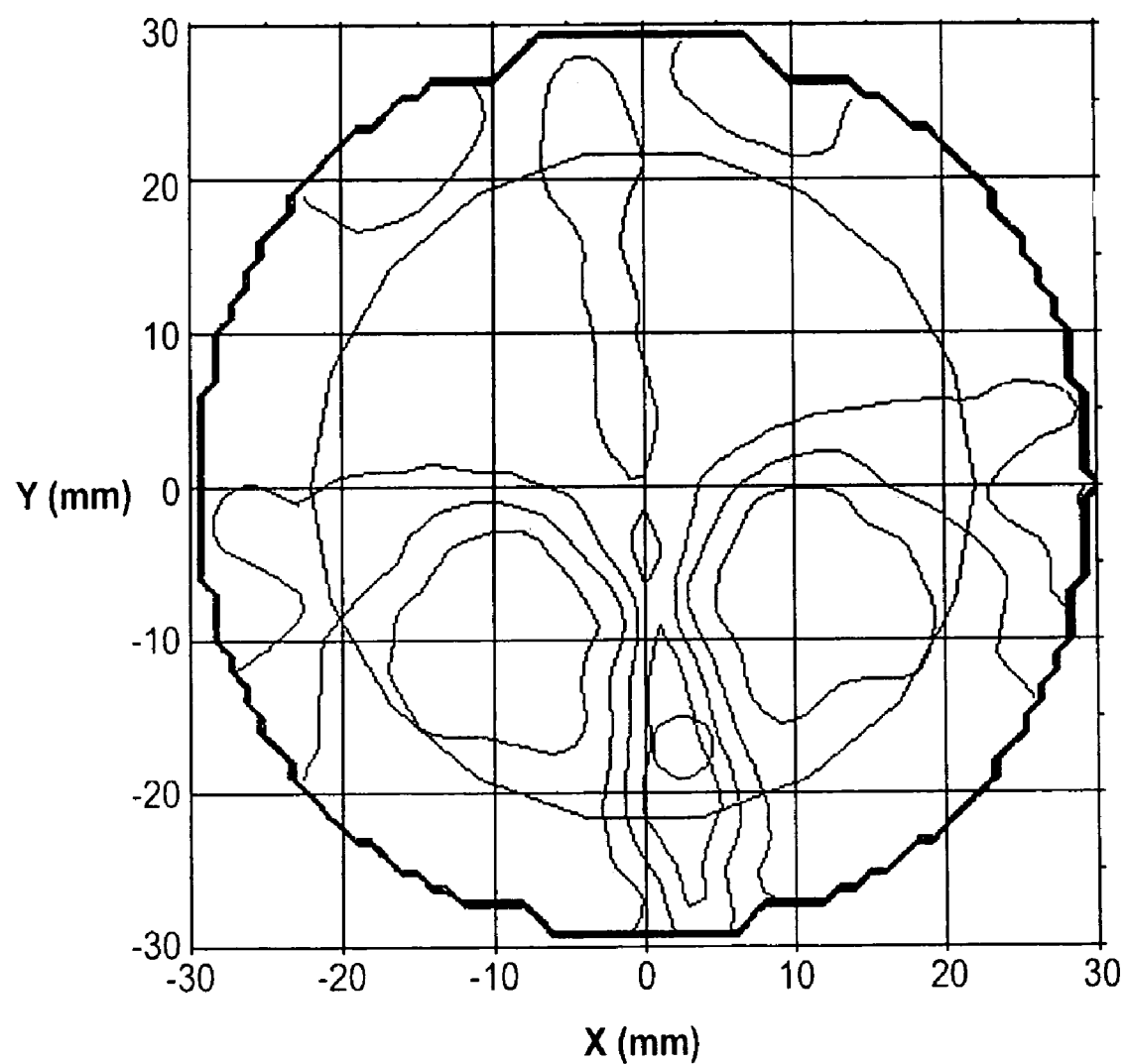
FIG. 5a is a contour map of the unwanted astigmatism of a second surface of a lens of the invention.
Figure 5B:
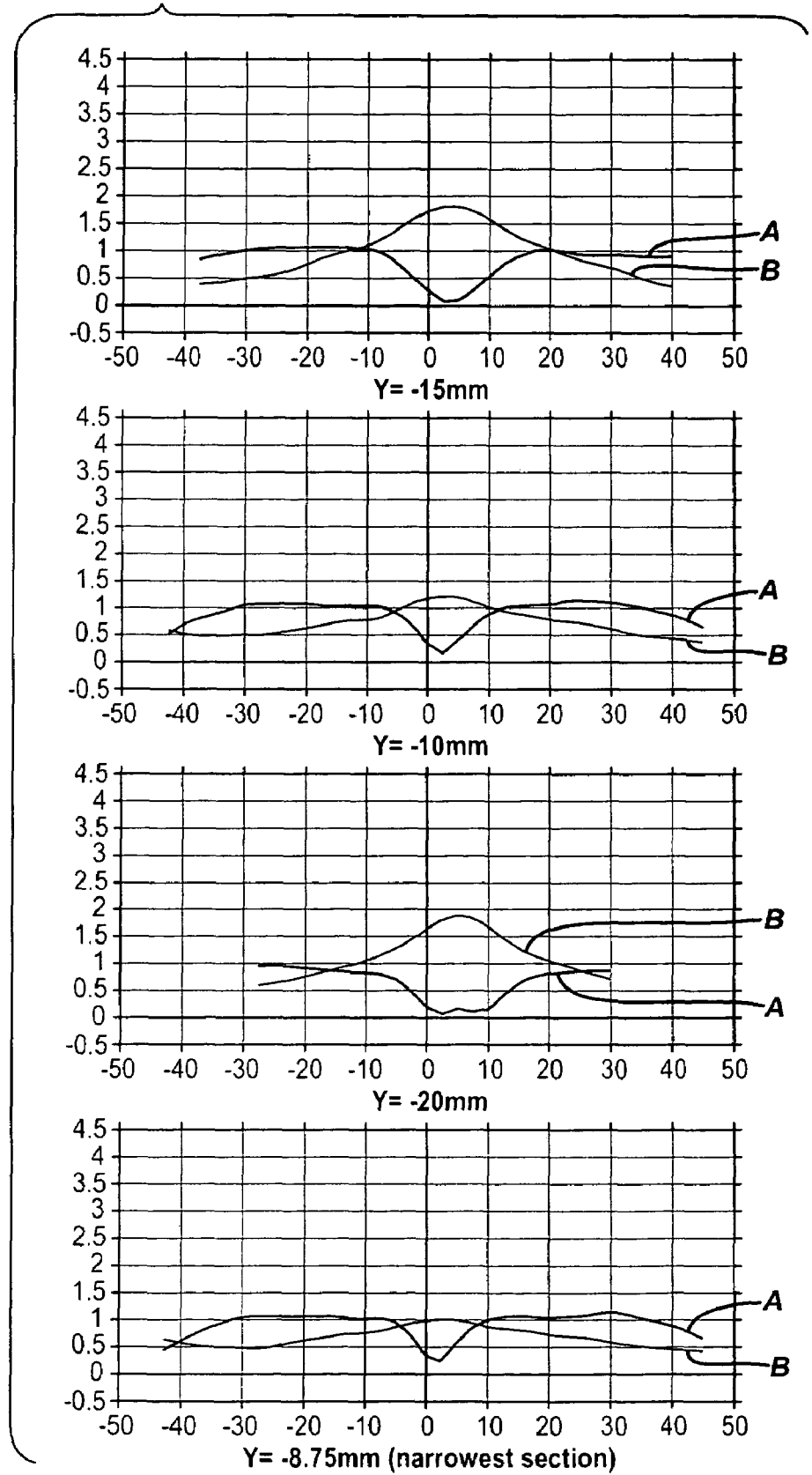

The surface produced by the above design methodology is a convex progressive addition surface B made from a material refractive index of 1.586, base curve of 103.7 mm and add power of 1.94 diopters. A grid spacing of 2 mm, a local area for the toric approximation of 9 points arranged as a 3×3 grid and increments of 0.0001 mm for sag changes were used. FIG. 5a depicts the unwanted astigmatism contours of Surface B. As listed on Table 1, the maximum, localized astigmatism was 1.17 diopters at x=12.6 mm and y=−11.1. mm. The prism reference point was x=0 and y=0. FIG. 5b shows the power and astigmatism profiles across various cross-sections of the channel (denoted by their y coordinates). The profile shows that the unwanted astigmatism maxima are significantly reduced in magnitude and are 0.10 diopters in a 10 mm diameter circle.

TABLE 1

| Optical Parameter | Lens 1 | Lens 2 | Lens 3 | Surface A | Surface B |
| --- | --- | --- | --- | --- | --- |
| Distance Power (D) | 0.01 | −0.01 | 0.08 | 0.03 | 0.09 |
| Add Power (D) | 2.04 | 2.10 | 2.04 | 2.02 | 1.94 |
| Distance Width (mm) | 7.9 | 14.2 | 13.5 | 12.4 | 9.7 |
| Reading Width (mm) | 18.3 | 15.5 | 16.2 | 15.4 | 27.5 |
| Reading Power Width (mm) | 13.8 | 12.4 | 8.0 | 6.3 | 4.0 |
| Channel Length (mm) | 11.6 | 12.5 | 12.8 | 12.2 | 12.2 |
| Channel Width (mm) | 6.6 | 6.7 | 8.8 | 8.0 | 8.3 |
| Max. Astig. Location (x, y in deg.) | 18.2, −10.7 | 15.3, −12.2 | 12.5, −12.3 | 8.8, −7.4 | 12.6, −11.1 |
| Max. Astig. (D) | 2.64 | 2.53 | 1.64 | 1.36 | 1.17 |
| Max Astig. Amp. Per 10 mm Diameter (D) | 0.25 | 0.40 | 0.25 | 0.20 | 0.10 |

What is claimed is:

1. A method for designing a progressive addition lens, comprising the steps of:
   a.) designing a first progressive addition surface having a channel, and one or more areas of unwanted astigmatism on either side of the channel, each area of unwanted astigmatism comprising a maximum unwanted astigmatism; b.) expressing the first surface as a plurality of sag values; and c.) modifying each of the one or more areas of unwanted astigmatism to provide a second progressive addition surface in which the maximum unwanted astigmatism of each of the areas is reduced and substantially constant throughout the area;
   wherein the modifying of a first area of a first unwanted astigmatism is independent of modifying all other areas of unwanted astigmatism.

2. The method of claim 1, further comprising d.) smoothing the second surface to eliminate discontinuities.

3. The method of claim 1, wherein step b.) further comprises expressing a surface u(x,y) as a plurality of sag values by subtracting u(x,y) from a base spherical surface $u_o(x, y)$ to yield the sag values.

4. The method of claim 1, wherein step c.) further comprises:
   (i) specifying a surface u(x,y) as a plurality of sag values at points on an x-y grid;
   (ii) defining an area which area comprises a point $(X_m, Y_m)$ of maximum unwanted astigmatism;
   (iii) approximating the sag values for the area using a tone surface;
   (iv) calculating principal curvatures at the point of maximum unwanted astigmatism; and
   (v) adjusting the sag values until the maximum unwanted astigmatism shifts to another surface location that is within the area; and
   (vi) repeating steps (iii) through (v) until the maximum unwanted astigmatism within the area is reduced and is substantially constant throughout the area.

5. The method of claim 4, wherein the area comprises a square centered at $(X_m, Y_m)$.

6. The method of claim 4, wherein the area comprises a circle centered at $(X_m, Y_m)$.

7. The method of claim 6, wherein the circle is of a diameter of about 1 to about 10 mm.

8. The method of claim 6, wherein the diameter of the circle is about 4 mm.

9. The method of claim 1, wherein the lens is a spectacle lens.

* * * * *